May 3, 1966  J. D. WILBORN  3,248,751
FISH CLEANING DEVICE
Filed Dec. 7, 1964
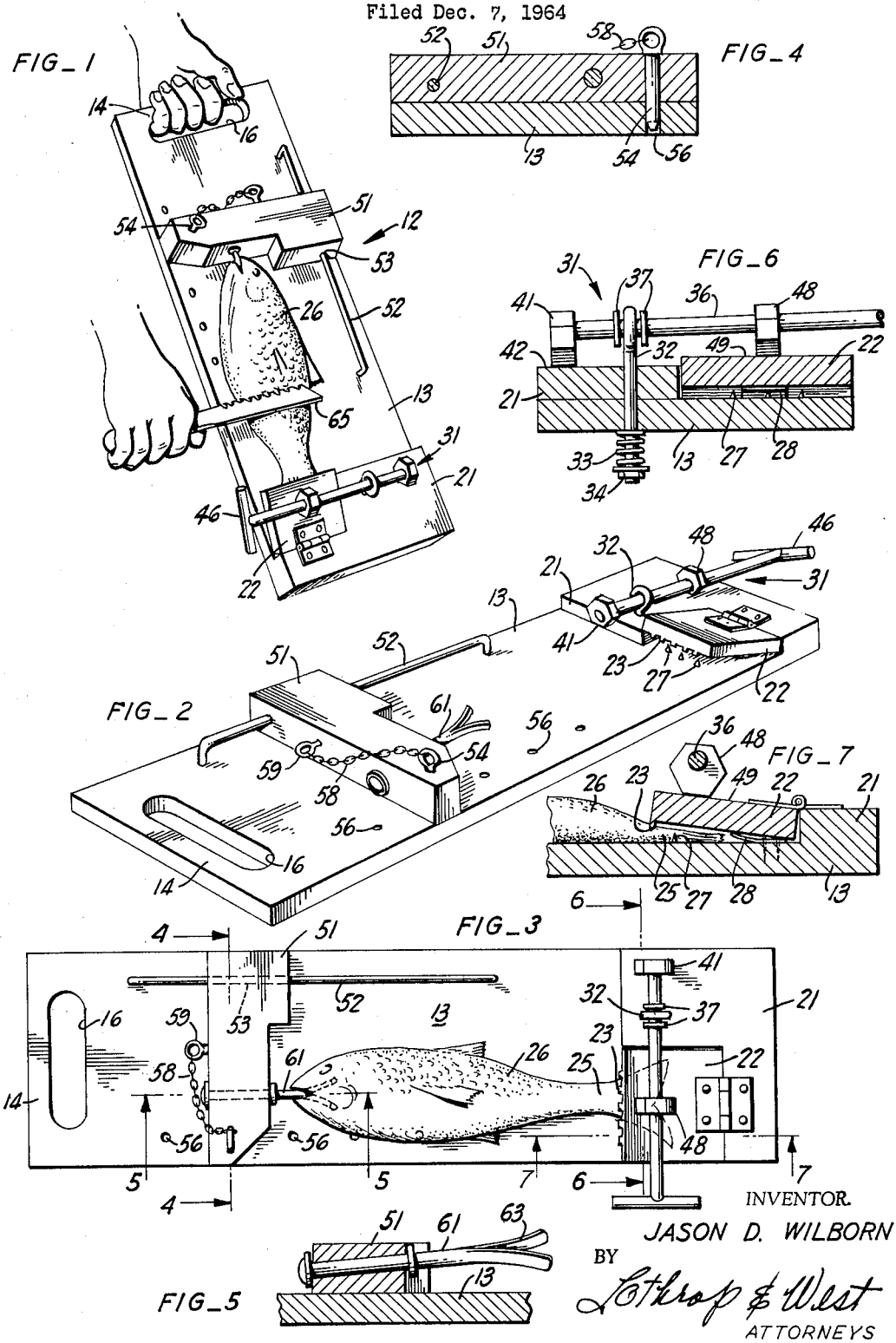
INVENTOR.
JASON D. WILBORN
BY Lothrop & West
ATTORNEYS

United States Patent Office 3,248,751
Patented May 3, 1966

3,248,751
FISH CLEANING DEVICE
Jason D. Wilborn, Rte. 1, Box 4675, Elverta, Calif.
Filed Dec. 7, 1964, Ser. No. 416,425
5 Claims. (Cl. 17—8)

The invention relates to apparatus for holding a fish while scaling.

The task of scaling fish is a tedious one. This is particularly true where it is necessary to scale a large number of small fish, such as crappies, bluegills and other panfish. The scaler's hands soon become covered with scales and slime, thus rendering the job even more difficult since the fish cannot then be securely held.

While the prior art is replete with devices purporting to hold fish in scaling position, some hold only the tail, and others, only the mouth. The prior devices holding both the tail and the mouth are relatively cumbersome in use and either require a considerable amount of time to operate, or employ a clip-board type of clamp which is ineffective to hold many kinds of fish, particularly when scale and slime has accumulated to any extent.

It is therefore an object of the invention to provide a fish scaling device which readily secures and continues to hold a fish in proper position for scaling.

It is another object of the invention to provide a scaling device which is convenient in size and relatively economical, yet which is durable and long lived owing to the few moving parts which can get out of order.

It is a further object of the invention to provide a generally improved fish scaling device.

Other objects, together with the foregoing are attained in the embodiment described in the following description and shown in the accompanying drawing in which:

FIG. 1 is an isometric view showing the device in typical use;

FIG. 2 is a further isometric view from a different vantage point and to a slightly enlarged scale, FIG. 2 showing the device in a position preparatory to receiving a fish to be scaled;

FIG. 3 is a top plan view showing a fish in position on the device and ready for scaling;

FIG. 4 is a transverse sectional view to an enlarged scale of the sliding block structure, the plane of the section being indicated by the line 4—4 in FIG. 3;

FIG. 5 is a longitudinal, fragmentary sectional view to an enlarged scale of the fish mouth pin structure, the plane of the section being indicated by the line 5—5 in FIG. 3;

FIG. 6 is a fragmentary transverse sectional view to an enlarged scale of the camming structure, the plane of the section being indicated by the line 6—6 in FIG. 3; and, FIG. 7 is a longitudinal fragmentary sectional view to an enlarged scale of the jaw structure, the plane of the section being indicated by the line 7—7 in FIG. 3.

While the fish scaling device of the invention is susceptible of numerous physical embodiments, depending upon the environment and requirements of use, substantial numbers of the herein shown and described embodiment have been made, tested and used, and all have performed in an eminently satisfactory manner.

The fish scaling device of the invention, generally designated by the reference numeral 12, comprises an elongated mounting board 13, preferably of wood, provided at one end with a convenient hand grasping member 14 defined by a transverse, slotted, finger opening 16.

At the other end of the board there is afforded a transverse fixed block 21, an elevated member extending across the mounting board and including at one side a hinged plate 22 formed on its lower front edge with a plurality of serrations 23 adapted to bite into the tail portion 25 of a fish 26 (see FIG. 7).

In corresponding fashion, a plurality of teeth 27 project upwardly from the mounting board 13 in approximate registry with the serrations 23 and form therewith a jaw or biting member adapted securely to hold the fish tail. In other words, the holding effort exerted by the jaw is not merely a frictional clamping effect but instead is a positive biting engagement.

A leaf spring 28 disposed under the hinge end of the plate 22 urges the jaw, or teeth, into open position.

Serving to overcome the bias of the leaf spring 28 and to force the serrations and the teeth into biting engagement with the fish tail is a camming mechanism, generally designated by the reference numeral 31.

The camming mechanism 31 comprises an eye bolt 32 vertically disposed in the fixed block and being freely rotatable about its vertical axis. A helical compression spring 33 interposed between the bottom of the mounting board 13 and a nut-held washer 34 adjacent the lower end of the eye bolt 32 urges the bolt in a downward direction.

Opposing the downward urgency of the spring 33 is a rod 36 passing through the eye of the bolt 32 and being positioned longitudinally by a pair of flanges 37 mounted on the rod on opposite sides of the eye.

Mounted on one end of the rod 36 is a first cam 41, preferably polygonal in cross section, such as a hexagonal nut, fastened eccentrically on the end of the rod. The first cam 41 is supported by the top surface 42 of the subjacent fixed block.

For ease in rotating the rod and in swinging the rod and eye bolt, there is mounted on the other end of the rod a handle 46, readily formed by attaching a cross bar on the rod end, for example.

Intermediate the handle 46 and the eye bolt 32 a second cam 48 is provided. The second cam 48 is preferably similar in size and shape to the first cam 41 and is mounted on the rod 36 in aligned registry with the first cam. Consequently, when the first cam 41 is rotated so that the maximum eccentricity, or cam throw, or cam offset, is effected, the second cam 48 simultaneously assumes a position of maximum downward effort (see FIGS. 6 and 7).

The second cam 48 bears downwardly on the top surface 49 of the hinge 22 when the rod is swung into a transverse operative position (see FIGS. 1, 3, 6 and 7), and thus clamps the jaws toward closed position when the rod is rotated about its own longitudinal axis so as to bring the camming mechanism into a position of exerting a substantial downward effort.

To release the jaws, the rod 36 is rotated about its own axis so as to decrease the downward effort exerted by the cams. Then, the handle, the rod, and the cams are swung into the longitudinal position shown in FIG. 2, the eye bolt concurrently rotating about its own vertical axis. As the cam 48 moves clear of the hinge plate 22, the leaf spring biases the plate 22 upwardly and thus opens the jaws to permit removal of the tail.

Although not shown, it is sometimes desirable to insert metal wear plates in the top surfaces of the fixed block and hinge plate to resist the wear exerted by the cam members as they are rotated and swung into and out of engagement with the underlying surfaces.

The head of mouth end of the fish is also appropriately secured, and in order to accomplish this result there is provided a movable block 51 adjacent the end of the mounting board 13 removed from the fixed block 21.

The block 51 is slidable on the top of the mounting board and is constrained to translate in a longitudinal direction by a rod 52 suitably mounted on the board and passing through a cylindrical opening 53 in the slidable block 51 (see FIGS. 1, 2, 3 and 4).

Longitudinal positioning of the block 51 is afforded by a vertical locating pin 54 (see FIG. 4) movably disposed within the block 51 and adapted to be inserted in a preselected one of a plurality of longitudinally aligned openings 56 in the mounting board. Preferably, the locating pin 54 is readily available at all times by a connecting chain 58 anchored to the slidable block, as by a screweye 59.

The fish head is appropriately held in place by a pin 61 located on the side of the slidable block removed from the track 52. The pin 61 extends in a direction toward the hinge plate 22 and, as appears most clearly in FIG. 5, is inclined upwardly in the direction toward the hinge plate so as to permit of ready engagement with the fish mouth. Additional security is afforded by splitting the end of the pin into a bifurcated portion 63 and making the pin of a springy or resilient material. With this construction, the user pinches together the two separated ends of the pin, inserts the fish's mouth over the pin ends and releases the pin ends, thus allowing the ends to spring apart, as appears most clearly in FIG. 3.

The shape of the mouth and gullet of the usual fish is such that the sprung apart ends of the pin 61 will securely position the head end of the fish. Further, since the majority of fish to be scaled with the device are substantially flat on opposite sides, it can readily be seen that after the fish is scaled on one side (see FIG. 1), as by a scaler 65, it is only necessary to release the fish tail by appropriate manipulation of the camming mechanism, turn the fish on its other side and re-engage the tail, by again manipulating the cams. It is not necessary during turning of the fish to disengage the fish from the bifurcated pin end since the pin is readily rotatable on its own axis.

At the conclusion of the scaling operation, the tail is again released and the fish is withdrawn from the mouth pin by grasping the body of the fish and pulling it in rearward and upward direction, coaxially with the slope of the pin 61. The mouth of a fish is ordinarily fairly tough and is effective to cam the pin ends inwardly toward each other an amount sufficient to permit of easy removal.

It can therefore be seen that I have provided a convenient, highly portable and efficient fish scaling device.

What is claimed is:
1. A fish cleaning device comprising:
   (a) an elongated mounting board;
   (b) a fixed block mounted on one end of said board, said block including a hinged jaw having serrations along one margin to engage one side of a fish tail;
   (c) spring means on said block for lifting said jaw;
   (d) a plurality of teeth upstanding from said board in approximate registry with said serrations to engage the opposite side of a fish tail;
   (e) means on said block for urging said jaw into closed position with said serrations and said teeth engaging a fish tail disposed therebetween;
   (f) a sliding block translatably disposed on the other end of said board, said sliding block including a pin projecting in the direction of and being in substantial alignment with said hinged jaw for engagement with the mouth of a fish held by the tail in said jaw; and,
   (g) track means on said board for guiding said sliding block in translational movement toward and away from said fixed block.

2. The device of claim 1 wherein said jaw urging means comprises an eye bolt rotatably mounted on and upstanding from said fixed block adjacent said jaw, a rod passing through said eye bolt, a first cam member on one end of said rod, a handle on the other end of said rod, and a second cam member intermediate said eye bolt and said handle, said first cam member bearing on said fixed block adjacent said jaw and said second member bearing on the top of said jaw, said cam members being in aligned registry for concurrently exerting downward force as said handle, said rod and said cam members are rotated into a position of maximum cam offset.

3. The device of claim 2 wherein said cam members are polygonal in cross section.

4. The device of claim 3 further characterized by spring means for urging said eye bolt axially downwardly.

5. The device of claim 4 further characterized by means for grasping said board adjacent the end removed from said fixed block.

References Cited by the Examiner

UNITED STATES PATENTS

| | | | |
|---|---|---|---|
| 867,182 | 9/1907 | Bahde | 17—8 |
| 1,259,109 | 3/1918 | Kugler et al. | 17—8 |
| 1,438,091 | 12/1922 | Bowe | 17—8 |
| 2,725,592 | 12/1955 | Pieper | 17—8 |
| 2,741,061 | 10/1956 | Harrison | 17—8 X |
| 2,974,357 | 3/1961 | Berg | 17—8 |

SAMUEL KOREN, *Primary Examiner.*

H. P. DEELEY, Jr., *Assistant Examiner.*